United States Patent
Cheng et al.

(10) Patent No.: US 10,739,837 B2
(45) Date of Patent: Aug. 11, 2020

(54) METHOD AND APPARATUS FOR POWER SUPPLY TO PROCESSOR

(71) Applicant: EMC IP Holding Company LLC, Hopkinton, MA (US)

(72) Inventors: Jesse Qiulin Cheng, Shanghai (CN); Jing Chen, Epping (AU); Jesse Xizhi Cui, Shanghai (CN); Wei Shu, Shanghai (CN); Hao Hu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 138 days.

(21) Appl. No.: 15/622,273

(22) Filed: Jun. 14, 2017

(65) Prior Publication Data

US 2017/0357304 A1 Dec. 14, 2017

(30) Foreign Application Priority Data

Jun. 14, 2016 (CN) .......................... 2016 1 0417578

(51) Int. Cl.
*G06F 1/00* (2006.01)
*G06F 1/324* (2019.01)
(Continued)

(52) U.S. Cl.
CPC .............. *G06F 1/324* (2013.01); *G06F 1/263* (2013.01); *G06F 1/3243* (2013.01);
(Continued)

(58) Field of Classification Search
CPC ........ G06F 1/324; G06F 1/263; G06F 1/3243; G06F 1/3296; G06F 1/3287; G06F 1/305; Y02D 10/126
See application file for complete search history.

(56) References Cited

U.S. PATENT DOCUMENTS

| 7,058,835 B1 | 6/2006 | Sullivan et al. |
| 7,421,552 B2 | 9/2008 | Long |
| (Continued) | | |

FOREIGN PATENT DOCUMENTS

| CN | 102012729 A | 4/2011 |
| CN | 102148531 A | 8/2011 |
| CN | 104836324 A | 8/2015 |

OTHER PUBLICATIONS

First Chinese Office Action (with English translation) issued by the Patent Office of the People's Republic of China dated Oct. 29, 2019 for Chinese Application No. 201610417578.6, Serial No. 2019102401737750, 16 pages.

*Primary Examiner* — Xuxing Chen
(74) *Attorney, Agent, or Firm* — BainwoodHuang

(57) ABSTRACT

Embodiments of the present invention relate to a solution for supplying power to a processor. In some embodiments, there is provided a method for supplying power to a processor. The method comprises, in response to determining that an output voltage of a main power supply supplying power to a processor is lower than a predefined threshold, enabling an additional power supply to supply power to the processor. The method further comprises determining output power of the additional power supply. In addition, the method further comprises, in response to determining that the output power of the additional power supply exceeds peak power limit of the additional power supply, sending, by the additional power supply, a signal to the processor to lower a clock frequency of the processor.

21 Claims, 7 Drawing Sheets

(51) Int. Cl.
*G06F 1/26* (2006.01)
*G06F 1/3234* (2019.01)
*G06F 1/3287* (2019.01)
*G06F 1/3296* (2019.01)
*G06F 1/30* (2006.01)

(52) U.S. Cl.
CPC .......... *G06F 1/3287* (2013.01); *G06F 1/3296* (2013.01); *G06F 1/305* (2013.01); *Y02D 10/126* (2018.01)

(56) References Cited

U.S. PATENT DOCUMENTS

| | | | |
|---|---|---|---|
| 7,696,643 B1 * | 4/2010 | Jai | G06F 1/263 307/80 |
| 7,830,770 B1 | 11/2010 | Linnell | |
| 7,849,263 B1 | 12/2010 | French | |
| 9,485,655 B1 | 11/2016 | Pirrotta | |
| 2004/0236969 A1 * | 11/2004 | Lippert | G06F 1/30 713/300 |
| 2005/0086545 A1 * | 4/2005 | Breen | G06F 1/263 713/300 |
| 2005/0283648 A1 * | 12/2005 | Ashmore | G06F 1/3203 714/5.11 |
| 2006/0187689 A1 * | 8/2006 | Hartular | H02M 3/156 363/63 |
| 2012/0161697 A1 * | 6/2012 | Park | G06F 1/263 320/108 |
| 2013/0088203 A1 * | 4/2013 | Solie | H02J 7/022 320/129 |
| 2015/0089260 A1 * | 3/2015 | Tsutsui | G06F 1/206 713/322 |

\* cited by examiner

METHOD AND APPARATUS FOR POWER SUPPLY TO PROCESSOR

RELATED APPLICATIONS

This application claim priority from Chinese Patent Application Number CN201610417578.6, filed on Jun. 14, 2016 at the State Intellectual Property Office, China, titled "METHOD AND DEVICE FOR POWER SUPPLY TO PROCESSOR" the contents of which is herein incorporated by reference in its entirety.

FIELD

Embodiments of the present disclosure generally relate to the processor field, and more specifically relate to a solution for supplying power to a processor.

BACKGROUND

Inside many computer platforms, there is usually an additional battery module besides a main power supply (also referred to as power supply unit (PSU) in the present disclosure) that supplies power to a processor (e.g. Central Processing Unit (CPU)). The battery module is used to take over the power delivery responsibility when the main power supply loses its power. Hence, the capacity of the battery module is typically designed to support running the whole system. If the system power consumption exceeds the peak power limit of the battery module, either the battery module or the whole system would be forced to shut down and might cause permanent damages or potential risk.

However, inventors have realized that in current system architecture, since the existing battery module does not have the active throttling functionality and also due to its peak power limit, a higher performance processor cannot be populated on a given platform. This is because the power consumption of the higher performance processor is highly likely to exceed the peak power limit of the existing battery module. In this case, if the higher performance processor is populated on an existing platform, when the main power supply losses its power, the battery module might be unable to support the normal running of the system, thereby causing users' data unusable and data loss (DUDL).

SUMMARY

Embodiments of the present disclosure provide a solution for supplying power to a processor.

According to a first aspect of the present disclosure, there is provided a method for supplying power to a processor. The method comprises, in response to determining that an output voltage of a main power supply supplying power to a processor is lower than a predefined threshold, enabling an additional power supply to supply power to the processor. The method further comprises determining output power of the additional power supply. In addition, the method further comprises, in response to determining that the output power of the additional power supply exceeds peak power limit of the additional power supply, sending a signal to the processor to lower a clock frequency of the processor.

According to a second aspect of the present disclosure, there is provided an apparatus for controlling power supply to a processor. The apparatus comprises a control module configured to, in response to determining that an output voltage of a main power supply supplying power to a processor is lower than a predefined threshold, enable an additional power supply to supply power to the processor. The apparatus further comprises a power determining module configured to determine output power of the additional power supply. In addition, the apparatus further comprises a signal sending module configured to, in response to determining that the output power of the additional power supply exceeds peak power limit of the additional power supply, send a signal to the processor to lower clock frequency of the processor.

According to a third aspect of the present disclosure, there is provided an additional power supply. The additional power supply comprises an apparatus for controlling power supply to a processor. The apparatus is configured to, in response to determining that an output voltage of a main power supply supplying power to the processor is lower than a predefined threshold, enable the additional power supply to supply power to the processor. The apparatus is further configured to determine output power of the additional power supply. In addition, the apparatus is further configured to, in response to determining that the output power of the additional power supply exceeds peak power limit of the additional power supply, send a signal to the processor to lower a clock frequency of the processor.

According to a fourth aspect of the present disclosure, there is provided a power supply system. The power supply system comprises a processor, a main power supply for supplying power to the processor, an additional power supply and, a control unit. The main power supply is configured to, in response to determining that first output power of the main power supply exceeds first peak power limit of the main power supply, send a first signal to the processor to lower clock frequency of the processor. The control unit is configured to, in response to determining that an output voltage of the main power supply is lower than a predefined threshold, enable the additional power supply to supply power to the processor. The control unit is further configured to determine second output power of the additional power supply. In addition, the control unit is further configured to, in response to determining that second output power of the additional power supply exceeds second peak power limit of the additional power supply, send a second signal to the processor to lower the clock frequency of the processor.

The summary is provided to introduce choices of concepts in a simplified manner, which will be further described in the detailed description below. The summary is not intended to identify critical features or main features of the embodiments of the present disclosure or limit the scope of the embodiments of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

Figure 1:
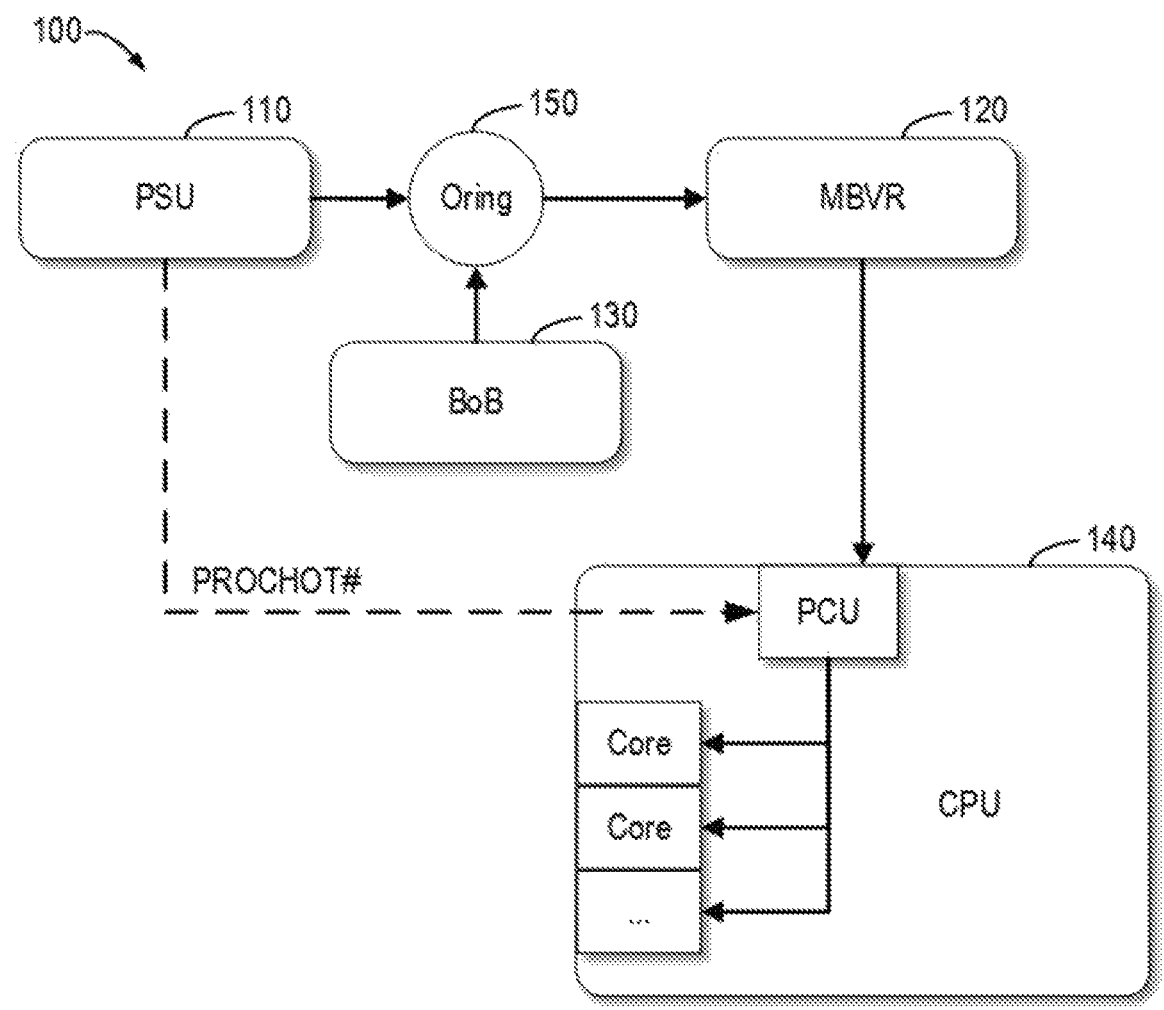
FIG. 1 shows an exemplary block diagram of a power supply system architecture 100 in the existing solution.

FIG. 1 shows an exemplary block diagram of a power supply system architecture 100 in an existing solution. It should be understood that the power supply system architecture 100 shown in FIG. 1 is only exemplary, in which only components related to embodiments of the present disclosure are shown, rather than all components in the existing computer platform.

As shown in FIG. 1, the system architecture 100 may comprise a PSU (also referred to as main power supply in the present disclosure) 110, a Mother Board Voltage Regulator (MBVR) 120, a Battery on Bus (BoB, also referred to as battery module or additional power supply in the present disclosure) 130 and a CPU 140. The MBVR 120 may be used to drive the CPU 140. The CPU 140 may be a single core processor or a multi-core processor as shown in FIG. 1. For example, the CPU 140 may have a power control unit (PCU). The PSU 110 and the BoB 130 may be connected to the MBVR 120 via an Oring circuit 150 (also referred to as a unilateral conducting circuit or circuit) such that CPU 140 can be powered by any of the PSU 110 and the BoB 130.

When the PSU 110 powers on, the BoB 130 is in charging state, and the PSU 110 will supply power to the CPU 140 via the MBVR 120. When the PSU 110 powers off, the BoB 130 enters discharging state and will, in place of PSU 110, supply power to the CPU 140 via the MBVR 120. Between these two power supply modules PSU 110 and BoB 130, however, only the PSU 110 has the active throttling functionality. During the normal power supply to the CPU 140 by the PSU 110, once the power drawn from the PSU 110 exceeds the peak power limit of the PSU 110, the PSU 110 will send a signal to the CPU 140 (e.g. PROCHOT # as shown in FIG. 1, wherein "#" represents the signal is active low) to ask the CPU 140 to lower its clock frequency, in order to let the system's whole power consumption drop to an acceptable range.

However, according to the foregoing conventional power supply solution, when the BoB 130, in place of the PSU 110, supplies power to the CPU 140, since the BoB 130 does not have the active throttling functionality; if the power drawn from the CPU 140 exceeds the peak power limit of the BoB 130, a user DUDL event might happen. This is bad for maintaining the correctness and integrity of the user data.

Figure 2:
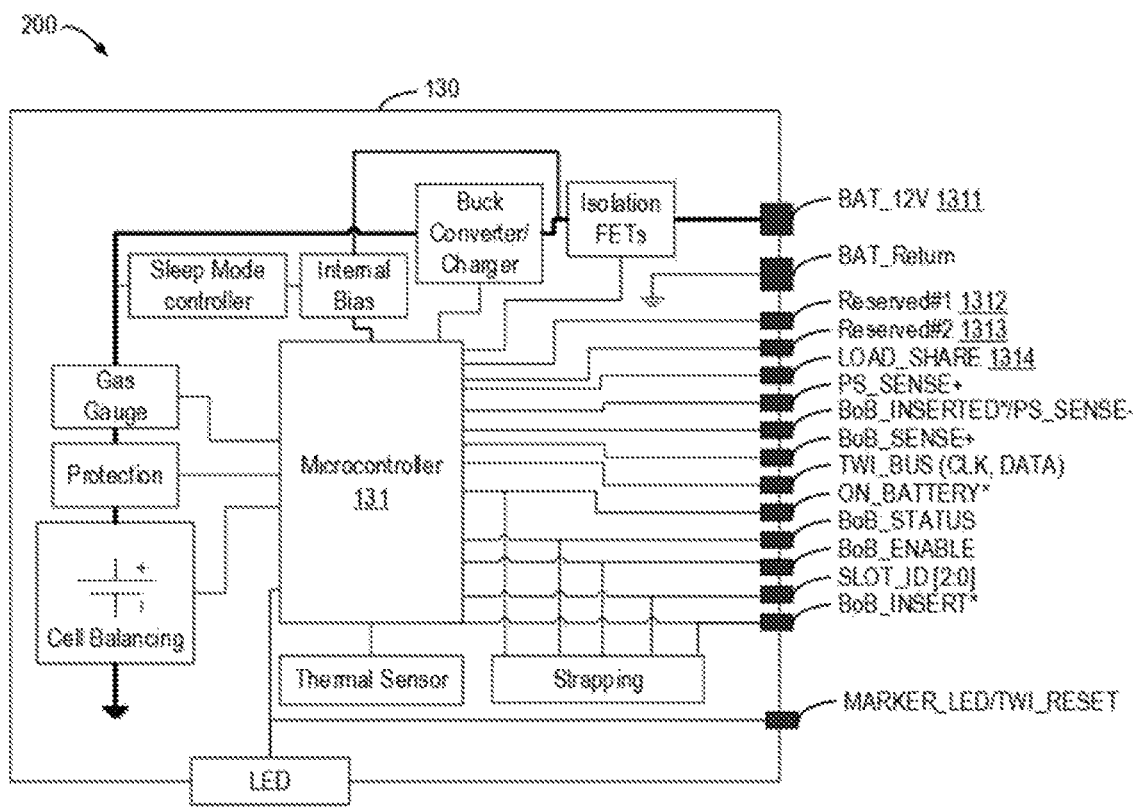
FIG. 2 shows an exemplary structure block diagram of a battery module 130 in the power supply system architecture 100 in the existing solution.

Consider one concrete scenario below. FIG. 2 depicts an exemplary structure block diagram of the battery module 130 in the power supply system architecture 100. In the exemplary structure as shown in FIG. 2, the BoB 130 may be connected to a system voltage via a pin BAT_12V 1311. BoB 130 may comprise a microprocessor 131, which is configured for battery management as well as communication and buck control. The microprocessor 131 may have multiple input and output pins. For example, the microprocessor 131 may have a pin LOAD_SHARE 1314, which is used for load balancing between two or more BoBs connected with one another. In addition, the pin LOAD_SHARE 1314 may also be used for detecting an output current of the BoB 130. Furthermore, the microprocessor 131 may further comprise reserved pins Reserve #1 1312 and Reserved #2 1313 which are used for further extending its functionality. A firmware may be executed in the microprocessor 131. For example, the firmware, when executed in the microprocessor 131, may control operations of the BoB 130.

In the conventional power supply solution, when the BoB 130 detects from the pin BAT_12V 1311 that the system voltage is above a predefined threshold (e.g. 11.65V) (indicating the PSU 110 as shown in FIG. 1 is in normal operating state), the BoB 130 may stay in charging state and do not supply power to CPU 140. When the BoB 130 detects that the system voltage is lower than the predefined threshold (indicating the PSU 110 is not, in normal operating state), the BoB 130 may enter discharging state and supply power to the CPU 140 in place of the PSU 110. During the power supply to the CPU 140 by the BoB 130, the BoB 130 may detect its output current and further determine its output power from the pin LOAD_SHARE 1314. However, since the BoB 130 does not have the active throttling functionality, if the BoB 130 determines that its output power exceeds its peak power limit, the BoB 130 may fail to timely notify CPU 140 for reducing the whole power consumption of the system. Therefore, a DUDL event might happen.

Figure 3:
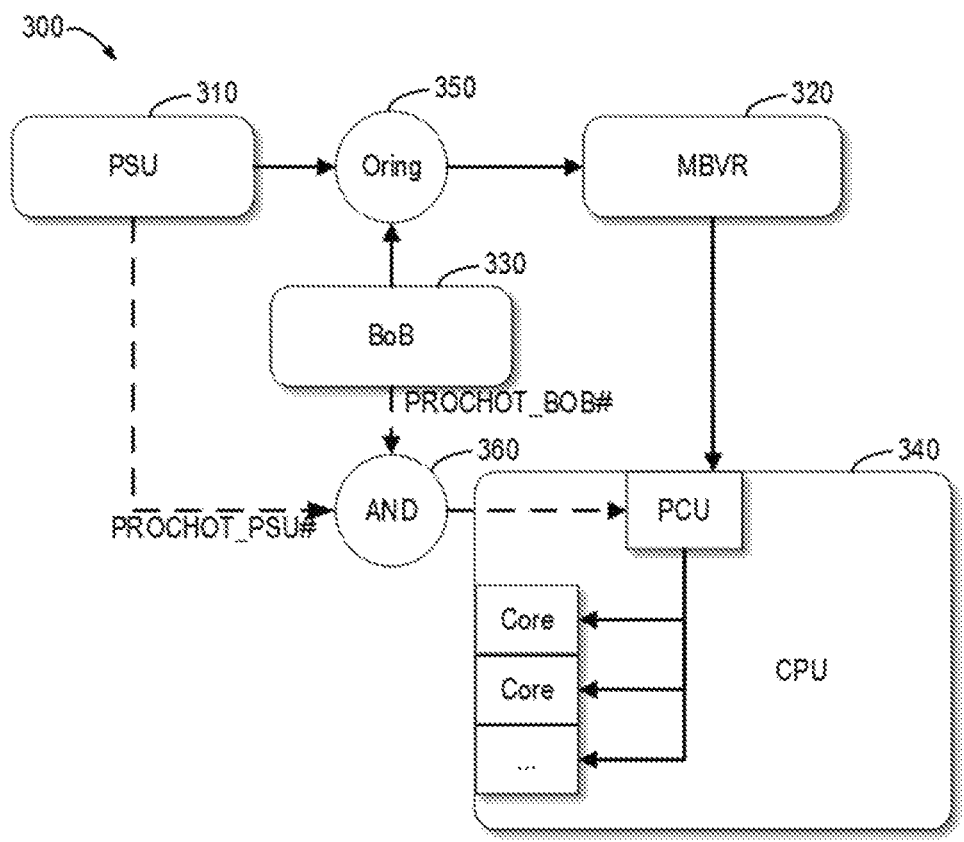
FIG. 3 shows an exemplary block diagram of a power supply system architecture 300 according to an embodiment of the present disclosure.

To solve the above and other potential problems and drawbacks, the embodiments of the present disclosure provide a solution for supplying power to a processor. FIG. 3 depicts an exemplary block diagram of a power supply system architecture 300 according to an embodiment of the present disclosure. By comparison with FIG. 1, detailed description about differences between the power supply system architecture 300 according to an embodiment of the present disclosure and the power supply system architecture 100 in the existing solution will be presented below.

Like the power supply system architecture 100 shown in FIG. 1, the power supply system architecture 300 as shown in FIG. 3 may comprise a PSU 310, an MBVR 320, a BoB 330 and a CPU 340. The MBVR 330 may be used to drive the CPU 340. The CPU 340 may be a single-core processor or a multi-core processor as shown in FIG. 3. The CPU 340 may have a power control unit (PCU). The PSU 310 and the BoB 330 may be connected to the MBVR 320 via an Oring circuit 350 such that the CPU 340 can be powered by any of the PSU 310 and the BoB 330. When the PSU 310 powers on, the BoB 330 is in charging state, and the PSU 310 will supply power to the CPU 340 via the MBVR 320. The PSU 310 has the active throttling functionality. Thereby, during the normal power supply to the CPU 340 by the PSU 310, if the power drawn from CPU 340 exceeds the peak power limit of the PSU 310, the PSU 310 may send to the CPU 340 a first signal (e.g. PROCHOT_PSU # as shown in FIG. 3, wherein "#" represents the signal is active low) to ask the CPU 340 to lower its clock frequency so as to let the system's whole power consumption drop to an acceptable range.

Unlike the power supply system architecture 100 shown in FIG. 1, the BoB 330 may also have the active throttling functionality. When the PSU 310 powers off, the BoB 330 may enter a discharging state and supply power to the CPU 340 via the MBVR 320 in place of PSU 310. During the power supply to the CPU 340 by the BoB 330, once the power drawn from CPU 340 exceeds the peak power limit of the BoB 330, the BoB 330 will send to the CPU 340 a second signal (e.g. PROCHOT_BOB # as shown in FIG. 3, wherein "#" represents the signal is active low) to ask the CPU 340 to lower its clock frequency, in order to let the system's whole power consumption drop to an acceptable range.

In some implementations, the first signal sent by the PSU 310 and the second signal sent by the BoB 330 may be transmitted to CPU 340 via a logic circuit. If the presence of the first and/or second signal is detected, the CPU 340 may lower its clock frequency. For example, as shown in FIG. 3, when the first and second signals are active low, the logic circuit may be an AND gate 360. Alternatively, in another implementation, when the first and second signals are active high, the logic circuit may be an OR gate (not shown in FIG. 3).

Figure 4:
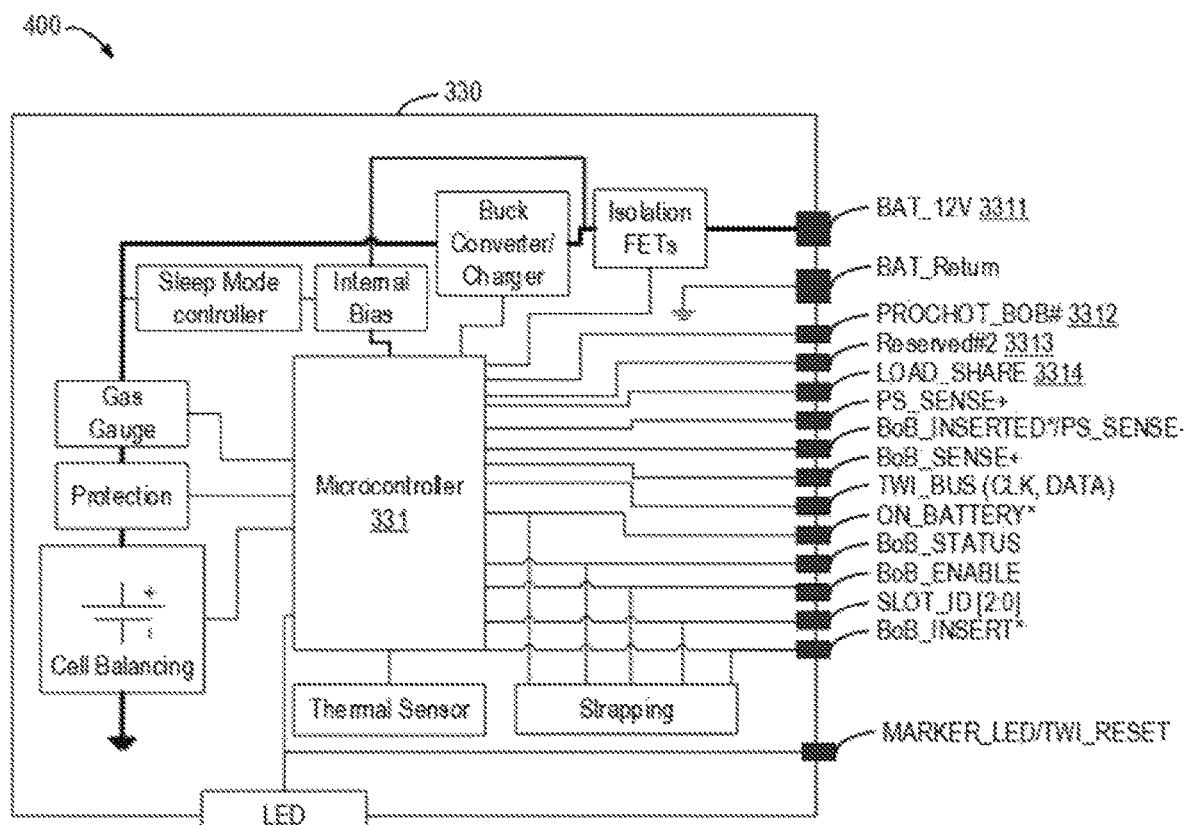
FIG. 4 shows a structure block diagram of a battery module 330 in the power supply system architecture 300 according to an embodiment of the present disclosure.

To realize the system architecture 300 as shown in FIG. 3, the embodiments of the present disclosure may provide a new battery module. FIG. 4 depicts a structure block diagram of a battery module 330 in the power supply system architecture 300 according to an embodiment of the present disclosure. By comparison with FIG. 2, detailed description about differences between battery module 330 according to an embodiment of the present disclosure and battery module 130 in the existing solution will be prevented below.

Like the battery module 130 shown in FIG. 2, the BoB 330 as shown in FIG. 4 may be connected to a system voltage via a pin BAT_12V 3311. The BoB 330 may comprise a microprocessor 331, which is configured for battery management and communication as well as and buck control. The microprocessor 331 may have multiple input and output pins. For example, the microprocessor 331 may have a pin LOAD_SHARE 3314, which is used for load balancing between two or more BoBs connected with one another. In addition, the pin LOAD_SHARE 3314 may also be used for detecting an output current of the BoB 330.

Unlike the battery module 130 shown in FIG. 2, among the input and output pins of microprocessor 331, a reserved pin 3312 is connected to CPU 340 as shown in FIG. 3 so as to output a second signal (e.g. PROCHOT_BOB # shown in FIG. 3) to the CPU 340. In addition, as to be described in detail below, a firmware, when executed in microprocessor 331, may cause the BoB 330 to perform operations as below.

When the BoB 330 detects from the pin BAT_12V 3311 that the system voltage is above a predefined threshold (e.g. 11.65V), it may indicate that the PSU 310 as shown in FIG. 3 is in normal operating state. At this point, the BoB 330 is in charging state and does not supply power to the CPU 340.

When the BoB 330 detects the system voltage is lower than the predefined threshold, it may indicate that the PSU 310 is not in normal operating state. As a response, the BoB 330 may enter discharging state and supply power to the CPU 340 in place of the PSU 310. During the power supply to the CPU 340 by the BoB 330, the BoB 330 may detect its output current and further determine its output power from the pin LOAD_SHARE 3314. When the BoB 330 determines its output power exceeds its peak power limit, it may send the second signal (e.g. PROCHOT_BOB # shown in FIG. 3) to CPU 340) to ask the CPU 340 to lower its clock frequency, letting the system's whole power consumption drop to an acceptable range. Thus, it can be seen that the solution for supplying power to a processor according to an embodiment of the present disclosure can effectively avoid the occurrence of DUDL events.

Figure 5:
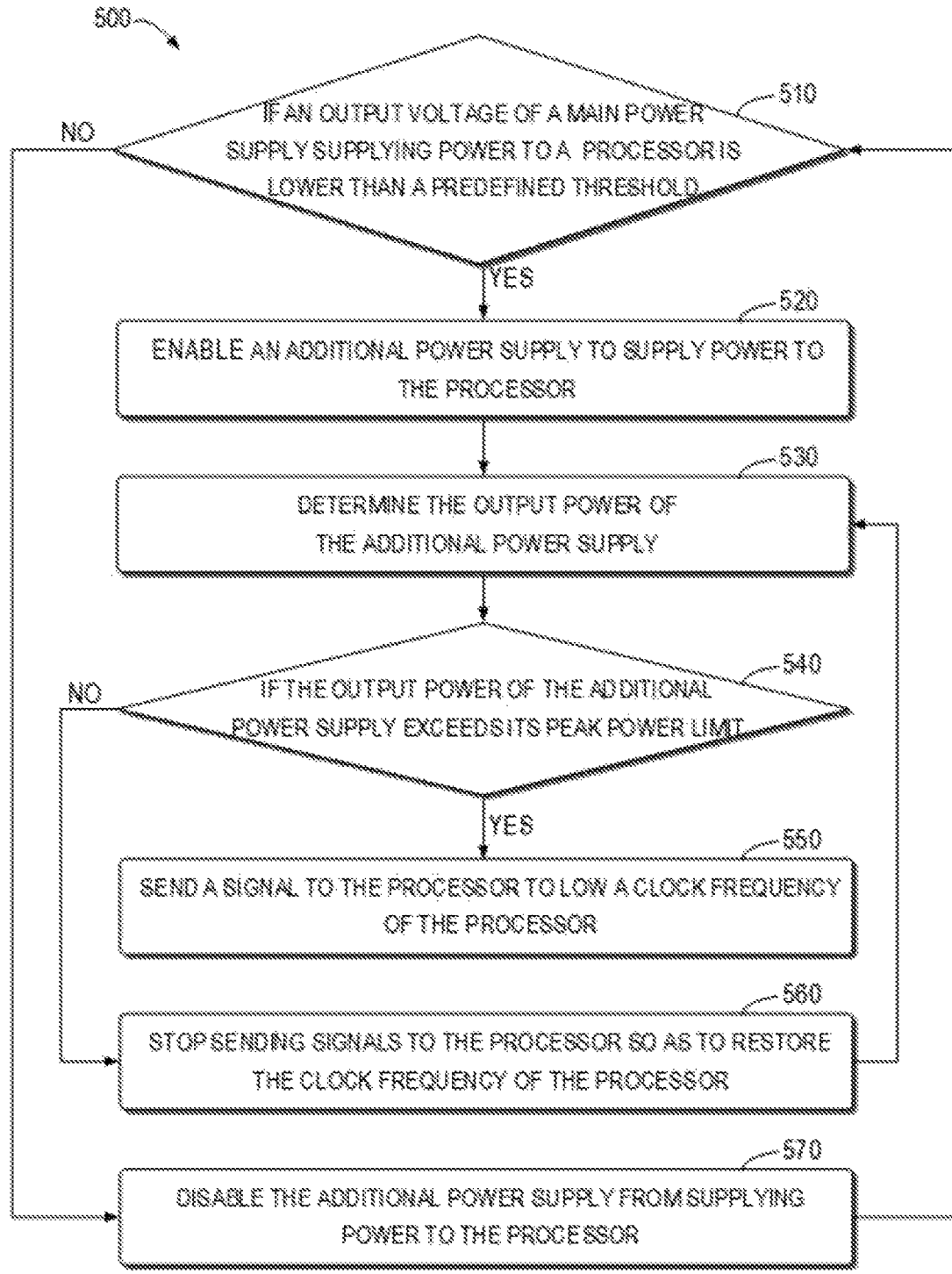
FIG. 5 shows a flowchart of a method 500 for supplying power to a processor according to an embodiment of the present disclosure.

FIG. 5 depicts a flowchart of a method 500 for supplying power to a processor according to an embodiment of the present disclosure. The method 500 will be detailed described with reference to FIG. 3 and FIG. 4. In some embodiments, the method 500 may be implemented by the BoB 330 shown in FIG. 3 and FIG. 4 (for example, the method 500 may be implemented as a firmware in the microprocessor 331 on the BoB 330). An example of the "additional power supply" mentioned in the following description is the BoB 330, an example of the "main power supply" is the RSU 310, and an example of the "processor" is the CPU 340. It should be understood that the method 500 may further comprise additional steps that are not shown and/or may omit any steps that are shown. The scope of the subject matter described in the present disclosure is not limited in this regard.

The method 500 is entered in step 510, in which an additional power supply determines whether or not an output voltage of a main power supply supplying power to the processor is lower than a predefined threshold. In some embodiments, for example, the BoB 330 may determine an output voltage of PSU 310 from a pin (e.g. the BAT_12V 3311 as shown in FIG. 4) connected to the system voltage.

If it is determined in step 510 that the output voltage of the main power supply is lower than the predefined threshold, then in step 520 the additional power supply is enabled to supply power to the processor. That is, if it is determined the output voltage of the main power supply is lower than the predefined threshold, the additional power supply may enter discharging state and supply power to the processor in place of the main power supply.

In step 530, the output power of the additional power supply is determined. In some embodiments, the output power of the additional power supply may be determined by detecting an output current of the additional power supply. For example, as shown in FIG. 4, the BoB 330 may detect its output current and further determine its output power from the pin LOAD_SHARE 3314.

Then in step 540, it is determined whether the output power of the additional power supply exceeds its peak power limit or not. If it is determined in step 540 that the output power of the additional power supply exceeds the peak power limit then in step 550 the additional power supply may send a signal to the processor to low a clock frequency of the processor. For example, as shown in FIG. 3, the BoB 330 may send to the CPU 340 a signal ROCHOT_ BOB # to ask CPU 340 to lower its clock frequency, in order to let the whole power consumption of the system drop to an acceptable range. Then, the method 500 returns to step 530.

In some embodiments, if it is determined in step 540 that the output power of the additional power supply is below the peak power limit, then in step 560 the additional power supply ceases sending signals, to the processor so as to restore the clock frequency of the processor. For example, as shown in FIG. 3, if the BoB 330 determines its output power is below its peak power limit, the BoB 330 may cease sending the signal ROCHOT_BOB # to the CPU 340 such that the CPU 340 is restored to its clock frequency. Next, the method 500 returns to step 530.

In some embodiments, if it is determined in step 510 that the output voltage of the main power supply is above the predefined threshold, then in step 570 the additional power supply is disabled from supplying power to the processor. That is, if it is determined the output voltage of the main power supply is above the predefined threshold, then the additional power supply may enter discharging state and only the main power supply may supply power to the processor. Then, the method 500 returns to step 510.

Figure 6:
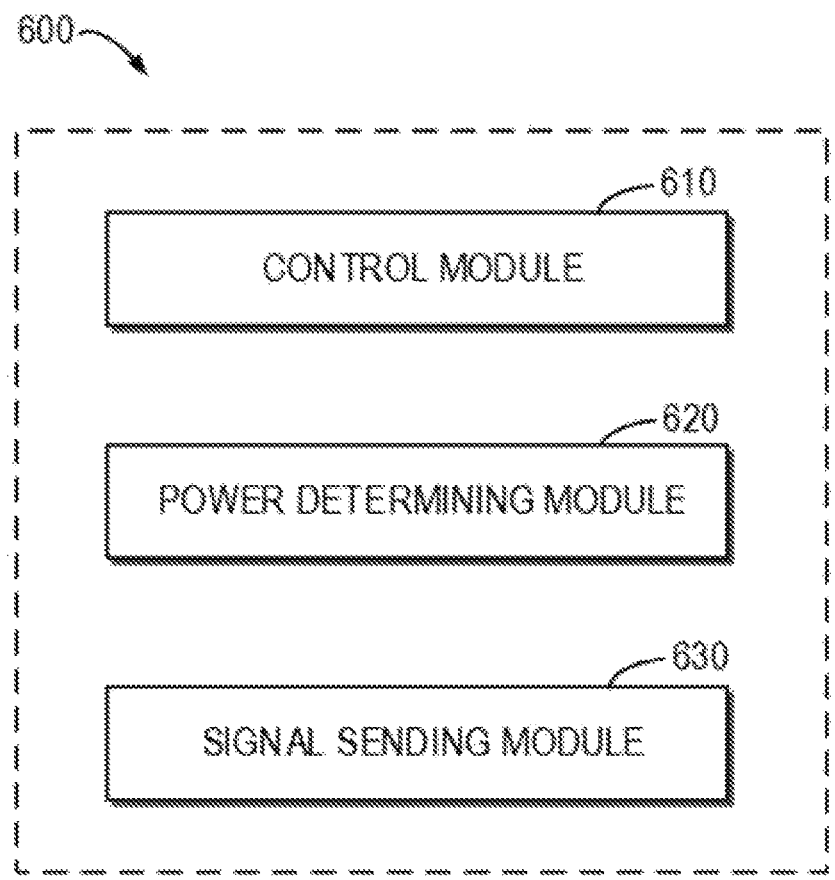
FIG. 6 shows a block diagram of an apparatus 600 for controlling power supply to a processor according to an embodiment of the present disclosure.

FIG. 6 depicts a block diagram of an apparatus 600 for controlling power supply to a processor according to an embodiment of the present disclosure. For example, the microprocessor 331 in the BoB 330 as shown in FIG. 4 may be implemented as the apparatus 600. As shown in FIG. 6, the apparatus 600 may comprise a control module 610 configured to, in response to determining that an output voltage of a main power supply supplying power to the processor is lower than a predefined threshold, enable an additional power supply to supply power to the processor. The apparatus 600 may further comprise a power determining module 620 configured to determine output power of the additional power supply. The apparatus 600 may further comprise a signal sending module 630 configured to, in response to determining that the output power of the additional power supply exceeds peak power limit of the additional power supply, send a signal to the processor to lower clock frequency of the processor.

In some embodiments, the control module 610 may further be configured to, in response to determining that the output voltage of the main power supply is above the predefined threshold, disable the additional power supply from supplying power to the processor. In some embodiments, power determining module 620 may be further configured to determine the output power of the additional power supply by detecting an output current of the additional power supply. In some embodiments, the signal sending module 630 may be further configured to, in response to determining that the output power of the additional power supply is below the peak power limit of the additional power supply, cease sending the signal to the processor so as to restore the clock frequency of the processor. In some embodiments, the signal is sent via a reserved pin of apparatus 600.

It should be understood that the various modules of the apparatus 600 may be hardware modules or software modules. For example, in some embodiments, the apparatus 600 may be implemented partially or completely with software and/or firmware, for example, implemented as a computer program product embodied on a computer readable medium. Alternatively or additionally, the apparatus 600 may be implemented partially or completely with hardware, for example, implemented as an integrated circuit (IC) chip, application-specific integrated circuit (ASIC), system on chip (SOC), field programmable gate array (FPGA) etc. The scope of the present invention is not limited in this regard.

The embodiments of the present disclosure further provide an additional power supply for supplying power to a processor. For example, the BoB 330 shown in FIG. 3 and FIG. 4 may be implemented as the additional power supply. The additional power supply may comprise means for supplying power to a processor. For example, the microprocessor 331 in the BoB 330 as shown in FIG. 4 may be implemented as the means for supplying power to the processor. According to an embodiment of the present disclosure, the means for supplying power to the processor is configured to, in response to determining that an output voltage of a main power supply supplying power to the processor is lower than a predefined threshold, enable the additional power supply to supply power to the processor. The apparatus may further be configured to determine output power of the additional power supply. The apparatus may further be configured to, in response to determining that the output power of the additional power supply exceeds peak power limit of the additional power supply, send a signal to the processor to lower a clock frequency of the processor.

Figure 7:
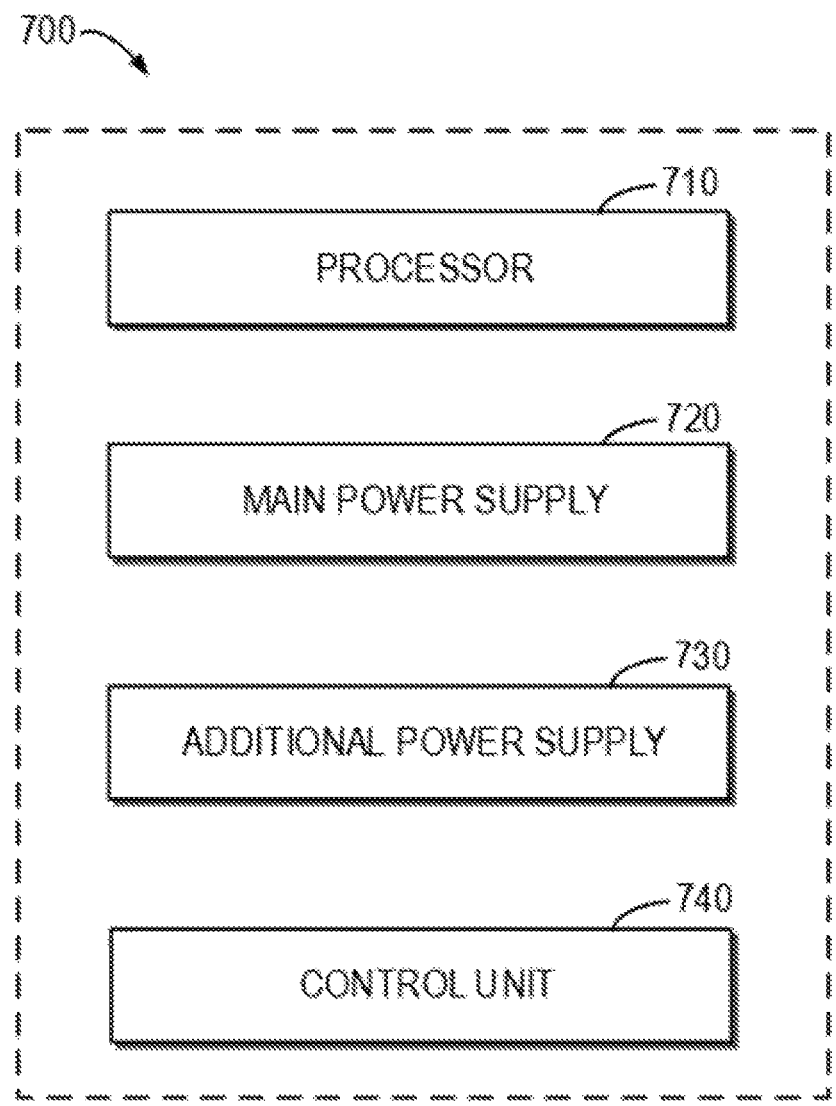
FIG. 7 shows a block diagram of a power supply system 700 according to an embodiment of the present disclosure.

FIG. 7 depicts a block diagram of a power supply system 700 according to an embodiment of the present disclosure. For example, the power supply system architecture 300 may be implemented as the power supply system 700. As shown in FIG. 7, the power supply system 700 may comprise a processor 710, a main power supply 720 for supplying power to processor 710, an additional power supply 730 and a control unit 740. In some embodiments, the control unit 740 may be located in the additional power supply 730. For example, the CPU 340 as shown in FIG. 3 may be implemented by the processor 710, the PSU 310 may be implemented by the main power supply 720, the BoB 330 may be implemented by the additional power supply 730, and the microprocessor (e.g. the microprocessor 331 as shown in FIG. 4) in the BoB 330 may be implemented by the control unit 740.

According to an embodiment of the present disclosure, the main power supply 720 is configured to, in response to determining that first output power of main power supply 720 exceeds first peak power limit of main power supply 720, send a first signal to processor 710 to lower clock frequency of processor 710. Control unit 740 is configured to, in response to determining that an output voltage of the main power supply 720 is lower than a predefined threshold, enable the additional power supply 730 to supply power to the processor 710. The control unit 740 is further configured to determine second output power of the additional power supply 730. In addition, the control unit 740 is further configured to, in response to determining that second output power of the additional power supply 730 exceeds second peak power limit of the additional power supply 730, send a second signal to the processor 710 to lower the clock frequency of processor 710.

In some embodiments, the power supply system 700 may further comprise a logic circuit. The first and second signals may be sent to processor 710 via the logic circuit. When both the first and second signals are active low, the logic circuit may be an AND gate. When both the first and second signals are active high, the logic circuit may be an OR gate.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program-instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for supplying power to a processor, comprising:
   in response to determining that an output voltage of a main power supply supplying power to a processor is lower than a predefined threshold, enabling, by a control unit, an additional power supply to supply power to the processor, the control unit being located in the additional power supply;
   determining, by the control unit of the additional power supply, an output power of the additional power supply; and
   in response to determining that the output power of the additional power supply exceeds peak power limit of the additional power supply, sending, by the control unit of the additional power supply, a signal to the processor to lower a clock frequency of the processor.

2. The method according to claim 1, further comprising:
   in response to determining that the output voltage of the main power supply is above the predefined threshold, disabling the additional power supply from supplying power to the processor.

3. The method according to claim 1, wherein the determining output power of the additional power supply comprises:
   determining the output power of the additional power supply by detecting an output current of the additional power supply.

4. The method according to claim 1, further comprising:
   in response to determining that the output power of the additional power supply is below the peak power limit of the additional power supply, ceasing sending the signal to the processor to restore the clock frequency of the processor.

5. The method according to claim 1, further comprising:
   prior to enabling the additional power supply and in response to the output voltage of the main power supply being above the predefined threshold indicating that the main power supply is in a normal operating state, disabling the additional power supply from supplying power to the processor.

6. The method according to claim 1, wherein the additional power supply includes a battery device; and wherein the method further comprises:
   charging the battery device of the additional power supply while the output voltage of the main power supply is above the predefined threshold.

7. The method according to claim 6, wherein the main power supply is susceptible to a power loss event; and wherein the method further comprises:
   encountering a power loss event in which the output voltage of the main power supply drops below the predefined threshold, the battery device providing power to the processor during the power loss event.

8. The method according to claim 1, further comprising:
   detecting, by circuitry of the additional power supply, whether the output voltage of the main power supply is below the predefined threshold, the additional power supply being disabled from supplying power to the processor while the output voltage of the main power supply is above the predefined threshold.

9. The method according to claim 8 wherein the main power supply provides a first clock frequency control signal to control the clock frequency of the processor; and
   wherein sending the signal to the processor to lower the clock frequency of the processor includes:
   providing, from the circuitry of the additional power supply, a second clock frequency control signal to control the clock frequency of the processor, the second clock frequency control signal being independent of the first clock frequency control signal.

10. The method according to claim 9 wherein providing, from the circuitry of the additional power supply, the second clock frequency control signal to control the clock frequency of the processor includes:
    outputting the second clock frequency control signal from the circuitry of the additional power supply to the processor, the second clock frequency control signal dropping overall power consumption from a first range in which the processor is susceptible to a data unusable and data loss (DUDL) event to a second range which protects the processor against a DUDL event.

11. The method according to claim 1, wherein the additional power supply includes active throttling circuitry constructed and arranged to output a clock frequency control signal; and
    wherein sending the signal to the processor includes:
    when the power drawn from the additional power supply exceeds the peak power limit, outputting the clock frequency control signal from the active throttling circuitry of the additional power supply to the processor to lower the clock frequency of the processor.

12. The method according to claim 1, wherein the main power supply and the additional power supply are constructed and arranged to deliver power to the processor via a mother board voltage regulator; and
    wherein the additional power supply is a battery on bus (BoB) coupled with active throttling circuitry.

13. An apparatus for controlling power supply to a processor, comprising:
    a control unit including a control module, a power determining module, and a signal sending module,
    wherein the control module of the control unit is configured to, in response to determining that an output voltage of a main power supply supplying power to a processor is lower than a predefined threshold, enable an additional power supply to supply power to the processor;
    wherein the power determining module of the control unit is configured to determine output power of the additional power supply;
    wherein the signal sending module of the control unit is configured to, in response to determining that the output power of the additional power supply exceeds peak power limit of the additional power supply, send a signal to the processor to lower a clock frequency of the processor, and
    wherein the control unit is located in the additional power supply.

14. The apparatus according to claim 13, wherein the control module is further configured to:
    in response to determining that the output voltage of the main power supply is above the predefined threshold, disable the additional power supply from supplying power to the processor.

15. The apparatus according to claim 13, wherein the power determining module is further configured to:
    determine the output power of the additional power supply by detecting an output current of the additional power supply.

16. The apparatus according to claim 13, wherein the signal sending module is further configured to:

in response to determining that the output power of the additional power supply is below the peak power limit of the additional power supply, cease sending the signal to the processor to restore the clock frequency of the processor.

17. The apparatus according to claim 13, wherein the signal is sent via a reserved pin of the apparatus.

18. A power supply system, comprising:
a processor;
a main power supply for supplying power to the processor, the main power supply being configured to:
   in response to determining that first output power of the main power supply exceeds first peak power limit of the main power supply, send a first signal to the processor to lower a clock frequency of the processor;
an additional power supply; and
a control unit configured to:
   in response to determining that an output voltage of the main power supply is lower than a predefined threshold, enable the additional power supply to supply power to the processor;
   determine second output power of the additional power supply; and
   in response to determining that second output power of the additional power supply exceeds second peak power limit of the additional power supply, send, a second signal to the processor to lower the clock frequency of the processor,
wherein the control unit is located in the additional power supply.

19. The power supply system according to claim 18, further comprising a logic circuit via which the first and second signals are sent to the processor.

20. The power supply system according to claim 19, wherein if both the first and second signals are active low, the logic circuit is an AND gate.

21. The power supply system according to claim 19, wherein if both the first and second signals are active high, the logic circuit is an OR gate.

* * * * *